(12) United States Patent
Lewis et al.

(10) Patent No.: US 9,721,032 B2
(45) Date of Patent: Aug. 1, 2017

(54) CONTEXTUAL URL SUGGESTIONS

(71) Applicant: Google Inc., Mountain View, CA (US)

(72) Inventors: Justin Lewis, Marina del Rey, CA (US); Michael Patrick Schneider, Venice, CA (US)

(73) Assignee: Google Inc., Mountain View, CA (US)

( * ) Notice: Subject to any disclaimer, the term of this patent is extended or adjusted under 35 U.S.C. 154(b) by 477 days.

(21) Appl. No.: 13/655,357

(22) Filed: Oct. 18, 2012

(65) Prior Publication Data

US 2015/0199423 A1  Jul. 16, 2015

(51) Int. Cl.
*G06F 15/16* (2006.01)
*G06F 17/30* (2006.01)

(52) U.S. Cl.
CPC .. *G06F 17/30887* (2013.01); *G06F 17/30011* (2013.01); *G06F 17/30864* (2013.01)

(58) Field of Classification Search
CPC ......... G06F 17/30011; G06F 17/30864; G06F 17/3089; G06F 17/30702; G06F 17/30861; G06F 17/30873; G06F 17/30887; G06F 2209/5021; H04N 21/4786; H04N 21/4826; H04L 47/803; H04L 41/0896; H04L 67/322; H04L 41/5022; H04L 47/20; H04L 47/2433; H04L 47/2475; H04L 47/765; H04L 47/822; H04L 5/0037; H04L 67/10; H04W 72/10
USPC ......... 709/201, 202, 203; 707/706, 722, 767
See application file for complete search history.

(56) References Cited

U.S. PATENT DOCUMENTS

| | | | | |
|---|---|---|---|---|
| 2006/0136453 | A1* | 6/2006 | Kwan | 707/101 |
| 2009/0158172 | A1* | 6/2009 | Ramsaur | G06Q 30/02 715/753 |
| 2009/0248669 | A1* | 10/2009 | Shetti | G06F 17/3064 |
| 2010/0131441 | A1* | 5/2010 | Gruenhagen et al. | 706/45 |
| 2011/0264736 | A1* | 10/2011 | Zuckerberg | G06Q 30/02 709/204 |
| 2012/0030774 | A1* | 2/2012 | Keith | H04L 63/0428 726/30 |
| 2012/0131032 | A1* | 5/2012 | Rakshit | G06F 17/30873 707/767 |
| 2012/0210225 | A1* | 8/2012 | McCoy et al. | 715/719 |
| 2013/0036344 | A1* | 2/2013 | Ahmed | G06F 17/30867 715/205 |
| 2013/0311535 | A1* | 11/2013 | Do | G06F 17/3089 709/201 |

* cited by examiner

*Primary Examiner* — Dustin Nguyen
*Assistant Examiner* — Hao Nguyen
(74) *Attorney, Agent, or Firm* — McDermott Will & Emery LLP

(57) ABSTRACT

A system and machine-implemented method for providing a suggestion for a uniform resource locator (URL) on an electronic device. One or more URLs are identified within content of at least one document accessed by the electronic device. Each of the identified one or more URLs are added to a list of suggested URLs. A request for a URL suggestion is received in association with an application running on the electronic device. In response to the received request, the URL suggestion is provided based on the list of suggested URLs.

20 Claims, 4 Drawing Sheets

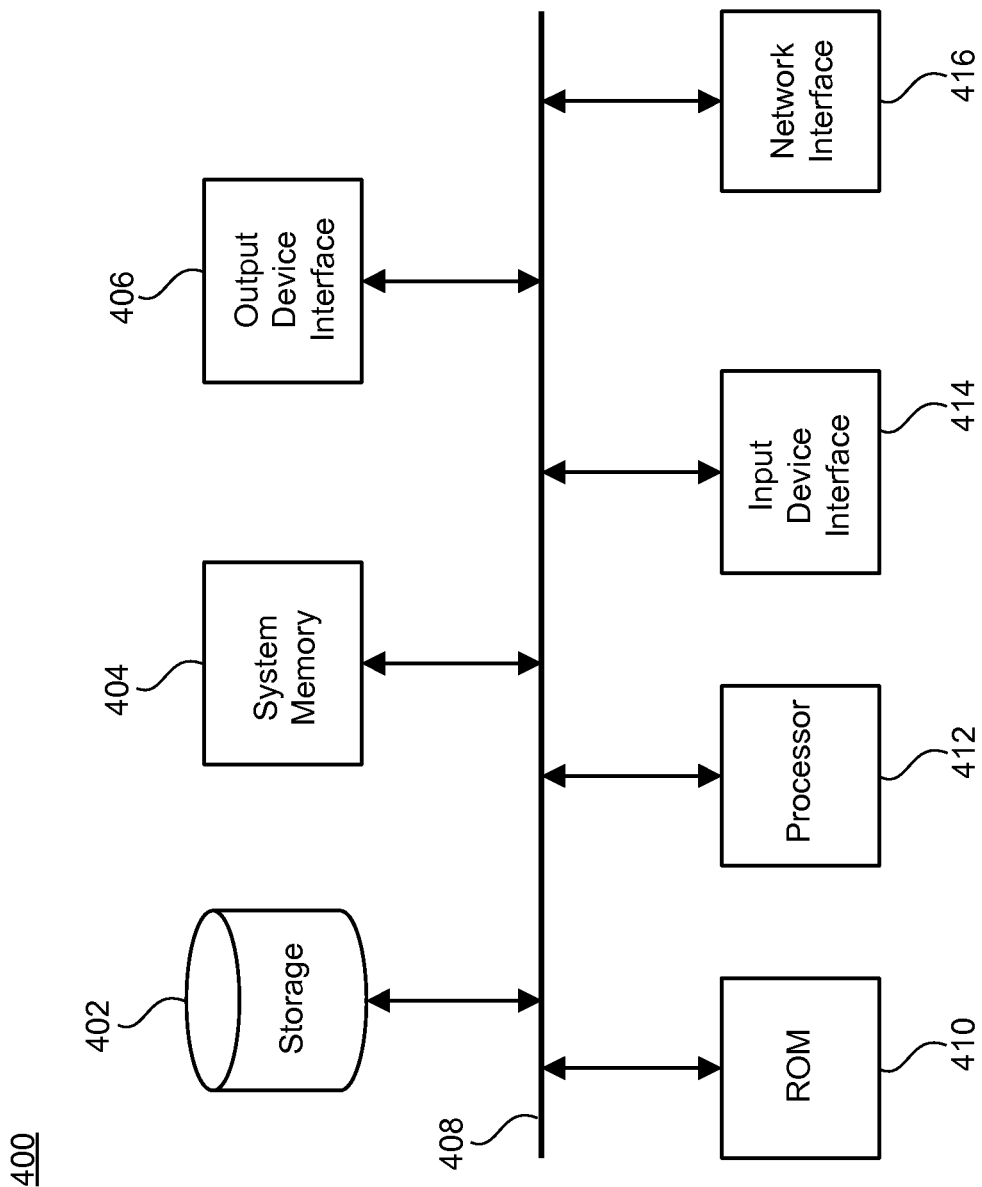

CONTEXTUAL URL SUGGESTIONS

BACKGROUND

The present disclosure generally relates to uniform resource locators (URLs) and, in particular, to providing a suggestion for a URL on an electronic device.

URLs may be difficult for users to type in, because the URLs may be long or contain strings with non-English characters. In addition, there are cases when a user is unable to copy/paste or click the URL button, for example when the user wants to watch a video from a URL received in a text message, or appearing in an advertisement on television. Further, many users may not understand how to use copy/paste a displayed URL, and may instead try to type the URL by hand.

SUMMARY

The disclosed subject matter relates to a machine-implemented method of providing a suggestion for a uniform resource locator (URL) on an electronic device. The method comprises identifying one or more URLs within content of at least one document accessed by the electronic device, and adding each of the identified one or more URLs to a list of suggested URLs. The method further comprises receiving a request for a URL suggestion in association with an application running on the electronic device, and providing, in response to the received request, the URL suggestion based on the list of suggested URLs.

The disclosed subject matter further relates to a system for providing a suggestion for a uniform resource locator (URL) on an electronic device. The system comprises one or more processors, and a machine-readable medium comprising instructions stored therein, which when executed by the processors, cause the processors to perform operations comprising identifying plural URLs within content of at least one document accessed by the electronic device. The operations further comprise adding each of the identified plural URLs to a list of suggested URLs, receiving a request for a URL suggestion in association with an application running on the electronic device, and providing, in response to the received request, the URL suggestion based on the list of suggested URLs.

The disclosed subject matter also relates to a machine-readable medium comprising instructions stored therein, which when executed by a system, cause the system to perform operations comprising identifying plural URLs within content of at least one document accessed by the electronic device. The operations further comprise adding each of the identified plural URLs to a list of suggested URLs, and receiving a request for a URL suggestion in association with an application running on the electronic device. In addition, the operations comprise providing, in response to the received request, multiple ones of the plural URLs for display, and receiving indication of a selection of a URL from the multiples ones of the plural URLs provided for display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

FIG. 4 conceptually illustrates an example electronic system with which some implementations of the subject technology can be implemented.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, URLs may be difficult for users to type in, because the URLs may be long or contain strings with non-English characters. In addition, there are cases when a user is unable to copy/paste or click the URL button, for example when the user wants to watch a video from a URL received in a text message, or appearing in an advertisement on television. Further, many users may not understand how to use copy/paste a displayed URL, and may instead try to type the URL by hand.

In this regard, URLs are often case-sensitive, and mistyping even one letter within a URL can take the user to a "not found" page. For example, the following sample URLs for the video_xyz.com domain may be entered incorrectly, leading to a "video not found" page:

http://www.video_xyz.com/watch?v=−rAkOMWBZyA
http://www.video_xyz.com/watch?v=5xm4uXo5894
http://www.video_xyz.com/watch?v=0FjJdIed13Q&feature=g-high-rec
http://www.video_xyz.com/watch?v=W4WGQmWcrbs&feature=g-high-rec
http://www.video_xyz.com/watch?v=hHQ0AgwLe5I&feature=g-high-rec Some web browsers provide URL suggestions based on URLs that a user has previously visited on a browser. For example, if a user visits the URL "http://www.video_xyz.com/watch?v=−rAkOMWBZyA," then this URL may be suggested as a URL at a later time. However, these suggestions are not contextual in nature, since the suggestions are not related to any content recently viewed or accessed by the user. In this regard, suggestions of previously visited URLs do not include suggestions for URLs found in documents previously accessed by the user (e.g., previously viewed emails).

The subject disclosure provides a suggestion for a URL on an electronic device. One or more URLs are identified within content of at least one document accessed by the electronic device. Each of the identified one or more URLs are added to a list of suggested URLs. A request for a URL suggestion is received in association with an application running on the electronic device. In response to the received request, the URL suggestion is provided based on the list of suggested URLs.

Figure 1:
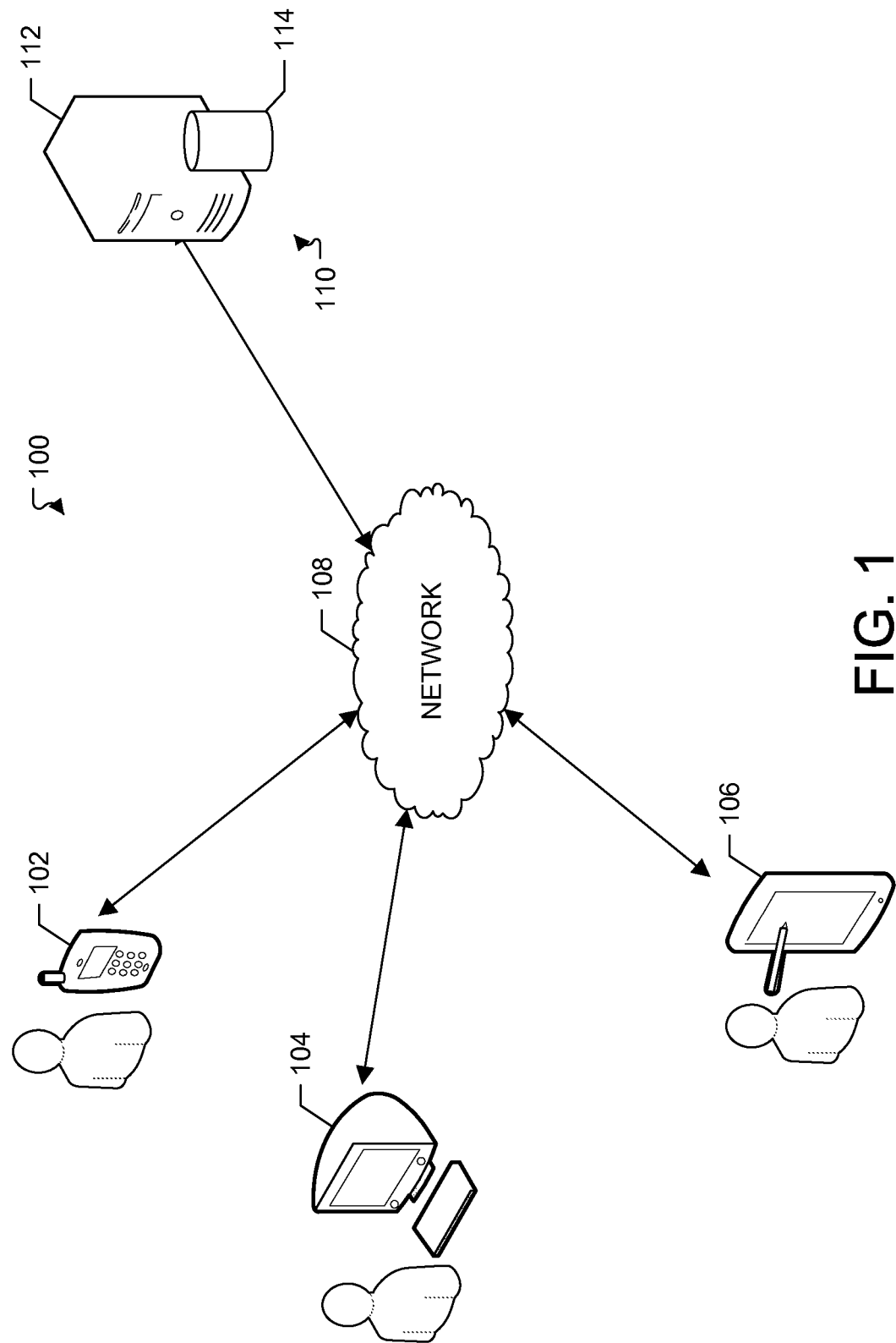
FIG. 1 illustrates an example network environment which can provide a suggestion for a URL on an electronic device.

FIG. 1 illustrates an example network environment which can provide a suggestion for a URL on an electronic device. A network environment 100 includes computing devices 102, 104 and 106 and computing system 110. Computing devices 102-106 and computing system 110 can communicate with each other through a network 108. Computing system 110 can include one or more computing devices 112 (e.g., one or more servers), respectively, and one or more computer-readable storage devices 114 (e.g., one or more databases), respectively.

Each of computing devices 102-106 can represent various forms of processing devices. Example processing devices include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, any of computing devices 102-106 or server 110 can provide a suggestion for a URL. The computing device (e.g., 102-106) or server 110 identifies one or more URLs within content of at least one document accessed by the computing device, and adds each of the identified one or more URLs to a list of suggested URLs. The computing device (e.g., 102-106) or server 110 receives a request for a URL suggestion in association with an application running on the electronic device, and provides, in response to the received request, the URL suggestion based on the list of suggested URLs.

In the example where server 110 performs the identifying, adding, receiving and providing steps for providing URL suggestions, these steps can be performed in association with a user profile. In particular, URLs can be identified from several different electronic devices which use (e.g., are logged into) the same user profile, and the URL suggestions can be provided based on documents accessed from the different electronic devices. In this example, server 110 stores the list of suggested URLs, and the electronic device (e.g., any of computing devices 102-106) accesses the list of suggested URLs via network 108.

Figure 2:
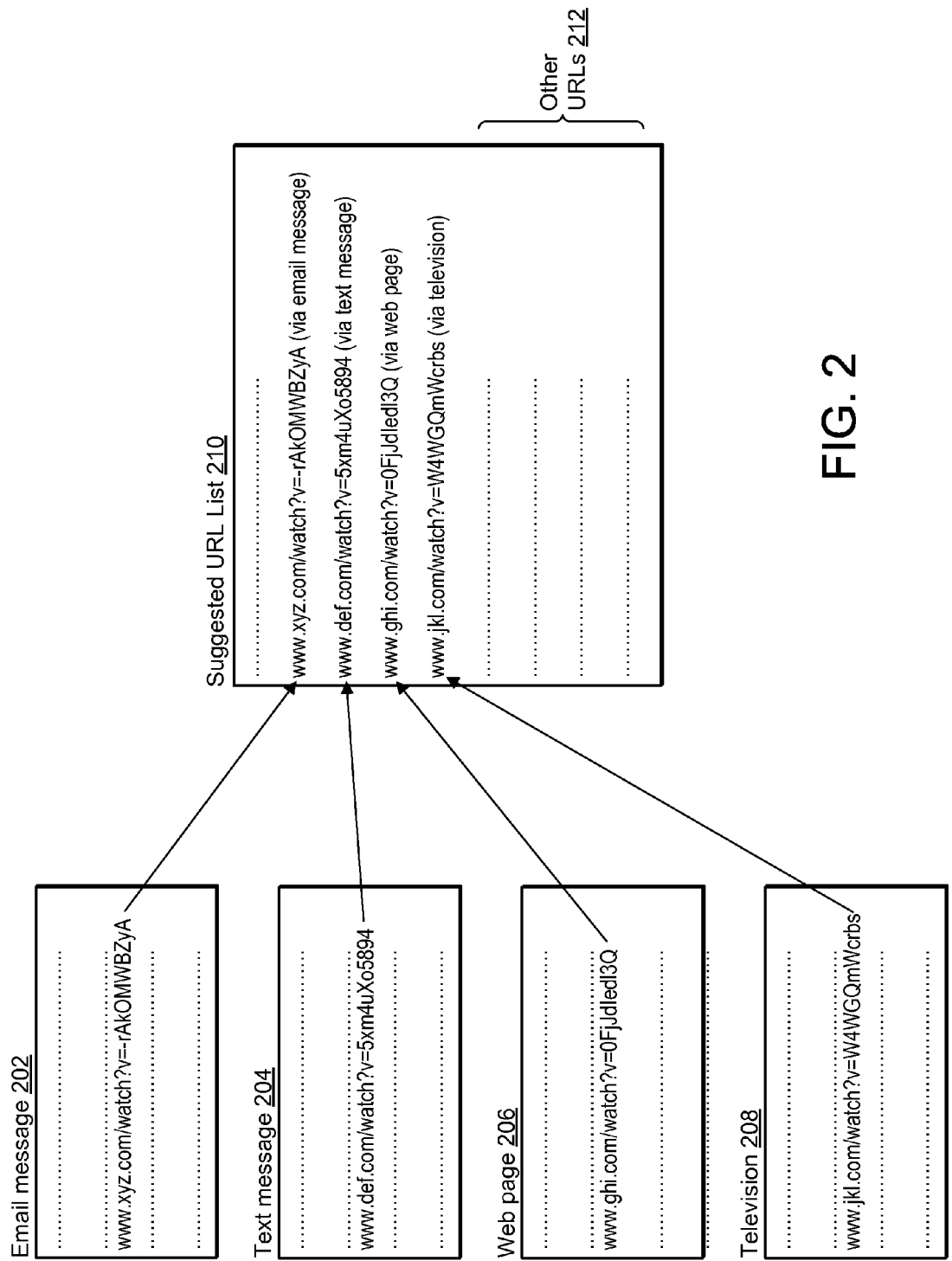
FIG. 2 illustrates an example of different documents from which URLs can be identified for adding to a list of suggested URLs.

FIG. 2 illustrates an example of different documents from which URLs can be identified for adding to a list of suggested URLs. In this regard, URLs can appear in the content of different documents accessed by an electronic device (or by multiple electronic devices). In the example of FIG. 2, each of email message 202, text message 204, web page 206 and television 208 correspond to different documents from which one or more URLs can be accessed.

The web pages, emails, chats and other documents that the user has recently or otherwise previously accessed (e.g., by one or more electronic devices) are scanned for URLs. In the example of FIG. 2, the content of email message 202 includes the URL "www.xyz.com/watch?v=-rAkOMW-BZyA." In addition, the content of text message 204 includes the URL "www.def.com/watch?v=5xm4uXo5894," and the content of web page 206 includes the URL "www.ghi.com/watch?v=0FjJdIed13Q."

Television 208 corresponds to television content previously viewed by a user of the electronic device. As seen in FIG. 2, the television content includes the URL "www.jkl.com/watch?v=W4WGQmWcrbs." In example aspects, both a television and the electronic device (e.g., any of computing devices 102-106) can be associated with a shared user profile. By virtue of sharing the user profile, the television content displayed on the television can be accessible by the electronic device, and vice versa. Thus, the electronic device can determine what content is displayed on a television, and one or more URLs can be identified within the television content. It should be noted that accessing television content by the electronic device is not limited to sharing a user profile between the electronic device and television, and that other techniques for accessing the television content can be used.

Although the example of FIG. 2 illustrates documents in the form of an email message, a text message, a web page and television content, the subject technology is not limited to such documents. In this regard, the subject technology can be applied any document with content that identifies a URL. Other examples of such documents include, but are not limited to, chat messages, messages from social networking applications or other web-based applications, locally-stored documents or images (e.g., photos), or personal documents associated with the electronic device.

Furthermore, the URL can appear within the document (e.g., email message 202, text message 204, web page 206, television 208) in text form, or as an image or video. When in image or video form, the image or video corresponding to the URL can be digitally processed (e.g., using optical character recognition) to produce text for the URL. For example, the electronic device (e.g., a smartphone, head-mounted glasses including an image capturing device and having network connectivity) can take a photograph of a billboard including a URL, and can perform optical character recognition on the photograph to produce text corresponding to the URL.

Once one or more URLs have been identified from document(s) previously accessed on the electronic device (e.g., any of computing devices 102-106), the electronic device can add the one or more URLs to a list of suggested URLs. For example, the list of suggested URLs can already include URLs which have been previously accessed by the electronic device. In another example, the list of suggested URLs can be newly-created for the electronic device. In example aspects, as each URL is identified within a document, it is automatically added to the list of suggested URLs. In the example of FIG. 2, suggested URL list 210 stores the URLs for "www.xyz.com/watch?v=–rAkOMWBZyA," "www.def.com/watch?v=5xm4uXo5894," "www.ghi.com/watch?v=0FjJdIed13Q" and "www.jkl.com/watch?v=W4WGQmWcrbs," as possible URL candidates for suggesting to a user.

A user of the electronic device (e.g., computing device 102-106) can be provided URL suggestions using the stored list of suggested URLs. For example, a user can type a URL into a browser (e.g., in a search box or a URL bar of the browser) of the electronic device. Alternatively, or in addition, the user can begin typing a URL (e.g., "www." or "http://www") within another application (e.g., within an email message, text message or text input interface of a social networking application) of the electronic device. As the user is typing the URL, the typed URL is compared to the list of suggested URLs (e.g., the list of recently viewed URLs). It should be noted that the user input is not limited to typing the URL, and can also apply to voice input, mouseclick input, or any other type of input for entering a URL.

If the typed URL is similar to any of the URLs in the list, then those similar URLs can be presented for display as possible auto-complete options. Using the example of FIG. 2, if a user at a browser partially enters "www.d" within a web browser or other application, the URL "www.def.com/watch?v=5xm4uXo5894" can be provided as a suggestion for the user.

The similarity of the typed URL to those in the list of URLs can be determined using a closeness scoring algorithm. As the user types more of the URL, the auto-completion feature selects more specific URLs within the list of suggested URLs. The more specific URLs can also be suggested using the closeness scoring algorithm.

It should be noted that as an alternative or addition to providing an auto-complete option (e.g., where the user has to begin typing), a user interface can be provided for the user to request a list of recent local URLs. In response to user selection of this user interface, all or part of the list of suggested URLs can be provided for display to the user, and the user can select from the list.

In addition, rather than corresponding to auto-complete text, the suggested URLs can be provided as suggested corrections within an auto-correct context. For example, if a user incorrectly enters a URL, a closeness scoring algorithm can be used to determine similar URLs within the list of suggested URLs, and these similar URLs can be provided as suggested corrections to the incorrectly-entered URL.

In example aspects, the URLs that are provided for display as suggestions can be displayed together with a description or indication of where the suggested URL came from. In other words, when any of the URLs are provided as a suggestion to a user, they can further be presented with an indication of where the URL was identified. In the example of FIG. 2, the URLs "www.xyz.com/watch?v=–rAkOMWBZyA," "www.def.com/watch?v=5xm4uXo5894," "www.ghi.com/watch?v=0FjJdIed13Q" and "www.jkl.com/watch?v=W4WGQmWcrbs" can be presented with descriptions "via email message," "via text message," "via web page" or "via television," respectively. Although not shown in FIG. 2, the indication of where the URL came from can include additional information, including, but not limited to, a sender/receiver of the content, or a timestamp associated with the content.

For example, the following URL and corresponding description (marked by "*") may be provided for display:

http://www.video_xyz.com/watch?v=–rAkOMWBZyA
*via text from joe

The description accompanying the URL provides a helpful context (e.g., a social context) for the URL and can help the user trust that the suggested URL is not malicious.

It is possible that a user of electronic device may not want to continuously add URLs to the list of suggested URLs for an extended time period. In this regard, content viewed by a user of the electronic device several days ago may not be as relevant a source for suggesting a URL than content viewed one hour ago. Accordingly, in example aspects, timestamps can be stored with the URLs when added to the list of suggested URLs. URLs added to the list of suggested URLs can be removed from the list after a predetermined period of time has passed, based on the associated timestamps.

In example aspects, the URLs stored in the list of suggested URLs can be adjusted to remove URL parameters deemed to be unnecessary. For example, the URL:

http://www.video_xyz.com/watch?v=–rAkOMWBZyA
may have originally looked like:
http://www.video_xyz.com/watch?v=–rAkOMWBZyA&feature=g-logo-xit In example aspects, the URL parameters deemed unnecessary can be determined based on analysis of regex patterns and string templates associated with the suggested URLs. For example, feature tags can be deemed unnecessary for inclusion within a suggested URL.

Thus, the subject technology provides suggested URLs based on the user's local and recent context (e.g., from previously accessed documents), across all types of media that the user may be accessing. One example advantage of considering the user's recent context for suggested URLs is that there is a higher likelihood to capture the actual URL that the user is trying to type. For example, it is possible that the user is trying to enter a URL that he/she recently saw in another document (e.g., web page, email, text message).

Figure 3:
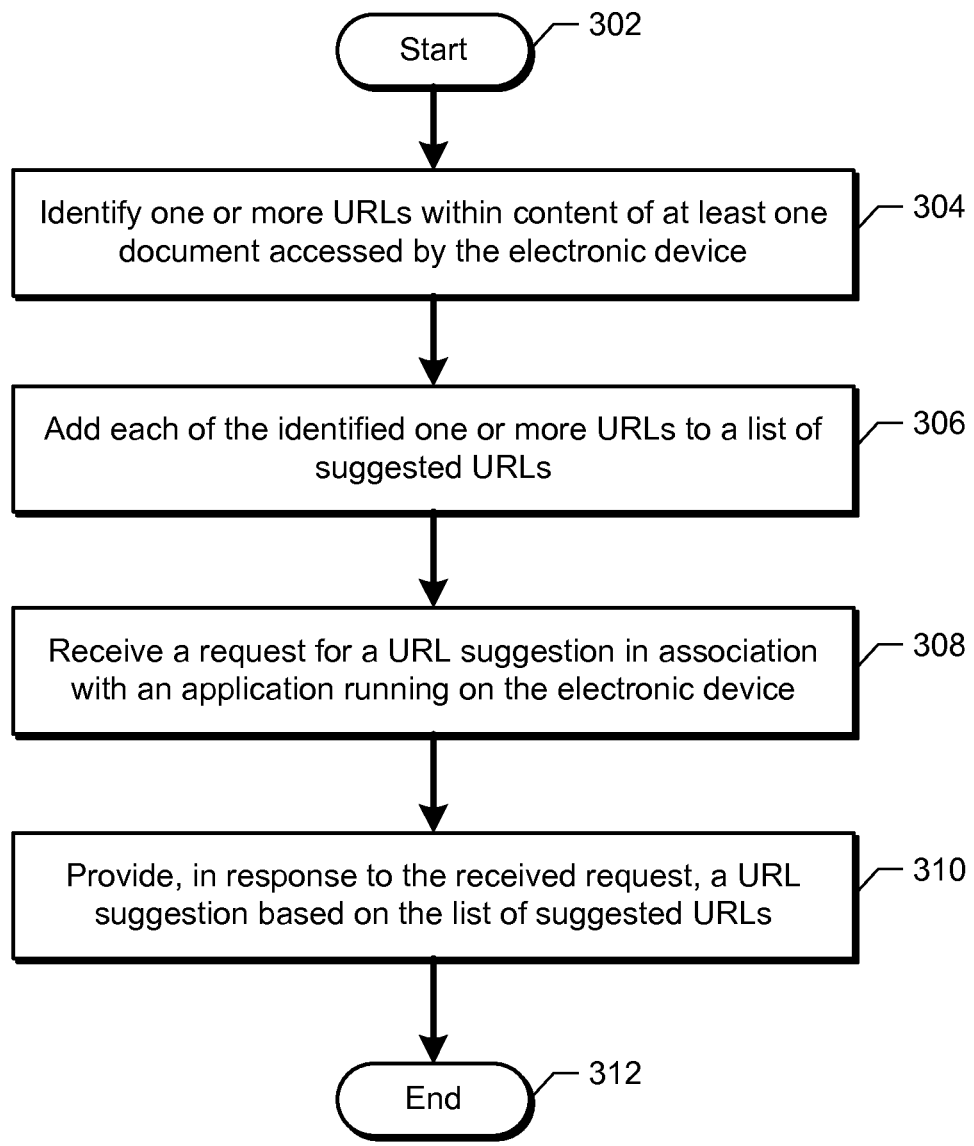
FIG. 3 illustrates an example process by which a suggestion for a URL is provided on an electronic device.

FIG. 3 illustrates an example process by which a suggestion for a URL is provided on an electronic device. Following start block 302, one or more URLs are identified within content of at least one document accessed by the electronic device at step 304. The at least one document can correspond to a text message, an email message, a web page, or television content accessed by the electronic device.

At step 306, each of the identified one or more URLs are added to a list of suggested URLs. Adding each of the identified one or more URLs to a list of suggested URLs can include creating the list of suggested URLs as a new list, and adding each of the identified one or more URLs to the new list.

Alternatively, or in addition, adding each of the identified one or more URLs to a list of suggested URLs can include accessing a previously-created list of suggested URLs, and adding each of the identified one or more URLs to the previously-created list of suggested URLs. The previously-created list of suggested URLs can include prior URLs accessed by a user of the electronic device.

At step 308, a request for a URL suggestion is received in association with an application running on the electronic device. The request can correspond to a user entering text within a web browser (e.g., in a search box or a URL bar of the web browser). Alternatively, or in addition, the user request can correspond to a user beginning to type a URL (e.g., "www." or "http://www") within another application, such as an email message, text message or text input interface of a social networking application.

At step 310, in response to the received request, the URL suggestion is provided based on the list of suggested URLs. The one or more URLs can include plural URLs, and providing the URL suggestion can include providing multiple ones of the plural URLs for display. Indication of a selection of a URL from the multiples ones of the plural URLs provided for display can be received. In association with each displayed URL, a indication of the document (e.g., a specific text message, email or web page) from which the displayed URL was identified can be provided.

The received request can correspond to partial entry of a URL in association with the application running on the electronic device, and providing the URL suggestion can further be based on the partial entry of the URL. The received request can correspond to an explicit request for the list of suggested URLs, and providing the URL suggestion can include providing each of the identified one or more URLs for display.

Each identified URL can associated with a timestamp. A determination can be made that a URL within the list of suggested URLs has expired, based on the timestamp for that URL, and the expired URL can be removed from the list of suggested URLs. The process then ends at end block 312.

Although certain examples provided herein can describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely on a server). In example aspects, the user information does not include and/or share the specific identification of the user (e.g., the user's name) unless otherwise specifically provided or directed by the user.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for providing a suggestion for a URL on an electronic device in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of providing a suggestion for a uniform resource locator (URL) on a first electronic device, the method comprising:
    processing content of at least one document accessed by one or more second electronic devices associated with a user of the first electronic device, the at least one document corresponding to respective ones of a plurality of types of media formats;
    extracting a URL from the processed content:
    modifying the extracted URL into a suggested URL string:
    adding the suggested URL string to a list of suggested URLs;
    receiving a request for a URL suggestion in association with an application running on the first electronic device; and
    providing, in response to the received request, a suggested URL string from the list of suggested URLs, the suggested URL string including an indication of at least one of the plurality of types of media formats and an indication of a sender of the content from which the suggested URL string was identified, wherein the suggested URL string is associated with a timestamp;
    determining that a URL within a suggested URL string in the list of suggested URLs has expired, based on the timestamp for that URL; and
    removing the suggested URL string having the expired URL from the list of suggested URLs.

2. The method of claim 1, wherein the at least one document corresponds to a text message, an email message, a web page, or television content accessed by the first electronic device.

3. The method of claim 1, wherein the extracting comprises extracting plural URLs, and wherein providing the suggested URL string comprises providing multiple ones of the plural URLs for display.

4. The method of claim 3, further comprising receiving indication of a selection of a URL from the multiples ones of the plural URLs provided for display.

5. The method of claim 1, wherein providing the suggested URL string further comprises:
    providing, in association with the suggested URL string, an indication of a timestamp associated with the content from which the suggested URL string was identified.

6. The method of claim 1, wherein the received request corresponds to partial entry of a URL in association with the application running on the first electronic device, and wherein providing the suggested URL string is further based on the partial entry of the URL.

7. The method of claim 1, wherein the received request corresponds to an explicit request for the list of suggested URLs, and wherein providing the suggested URL string comprises providing the suggested URL string for display.

8. The method of claim 1, wherein the adding comprises:
    creating the list of suggested URLs as a new list; and
    adding the suggested URL string to the new list.

9. The method of claim 1, wherein the adding comprises:
    accessing a previously-created list of suggested URLs; and adding the suggested URL string to the previously-created list of suggested URLs.

10. The method of claim 9, wherein the previously-created list of suggested URLs comprises prior URLs accessed by the user of the first electronic device.

11. A system for providing a suggestion for a uniform resource locator (URL) on a first electronic device, the system comprising:
    one or more processors; and
    a non-transitory machine-readable medium comprising instructions stored therein, which when executed by the processors, cause the processors to perform operations comprising:
        processing content of at least one document accessed by one or more second electronic devices associated with a user of the first electronic device, the at least one document corresponding to respective ones of a plurality of types of media formats;
extracting a URL from the processed content;
modifying the extracted URL into a suggested URL string;
adding the suggested URL string to a list of suggested URLs;
receiving a request for a URL suggestion in association with an application running on the first electronic device; and
providing, in response to the received request, a suggested URL string from the list of suggested URLs, the suggested URL string including an indication of at least one of the plurality of types of media formats for the at least one document from which the URL is identified, wherein each identified URL is associated with a timestamp;
determining that a URL within a suggested URL string in the list of suggested URLs has expired, based on the timestamp for that URL; and
removing the suggested URL string having the expired URL from the list of suggested URLs.

12. The system of claim 11, wherein the at least one document corresponds to a text message, an email message, a web page, or television content accessed by the first electronic device.

13. The system of claim 11, wherein the extracting comprises extracting plural URLs from the processed content, wherein providing the suggested URL string comprises providing multiple ones of the plural URLs for display.

14. The system of claim 13, further comprising receiving indication of a selection of a URL from the multiples ones of the plural URLs provided for display.

15. The system of claim 11, wherein the received request corresponds to partial entry of a URL in association with the application running on the first electronic device, and wherein providing the suggested URL string is further based on the partial entry of the URL.

16. The system of claim 11, wherein the received request corresponds to an explicit request for the list of suggested URLs, and wherein providing the suggested URL string comprises providing the suggested URL string for display.

17. The system of claim 11, wherein the adding comprises:

creating the list of suggested URLs as a new list; and
adding the suggested URL string to the new list.

18. A non-transitory machine-readable medium comprising instructions stored therein, which when executed by a first system, cause the first system to perform operations comprising:
processing content of at least one document accessed by one or more second systems associated with a user of the first system, the at least one document corresponding to respective ones of a plurality of types of media formats;
extracting plural URLs from the processed content;
modifying each of the extracted URLs into respective suggested URL strings;
adding each of the suggested URL strings to a list of suggested URLs;
receiving a request for a URL suggestion in association with an application running on the first system;
providing, in response to the received request, multiple ones of the suggested URL strings for display; and
receiving indication of a selection of a URL from the multiples ones of the suggested URL strings provided for display, each of the suggested URL strings provided for display including an indication of at least one of the plurality of types of media formats for the at least one document from which the URL is identified, wherein each identified URL is associated with a timestamp;
determining that a URL within a suggested URL string in the list of suggested URLs has expired, based on the timestamp for that URL; and
removing the suggested URL string having the expired URL from the list of suggested URLs.

19. The method of claim 1, further comprising:
determining that the received request includes an incorrectly-entered URL;
determining one or more URLs from the list of suggested URLs that are similar to the incorrectly-entered URL; and
providing the one or more URLs as suggested corrections to the incorrectly-entered URL.

20. The method of claim 1, wherein modifying the extracted URL comprises removing one or more URL parameters from the extracted URL.

* * * * *